W. F. FOLMER.
MAGAZINE BACK FOR CAMERAS.
APPLICATION FILED DEC. 18, 1913.

1,255,868.

Patented Feb. 12, 1918.
2 SHEETS—SHEET 1.

Inventor
William F. Folmer

Witnesses

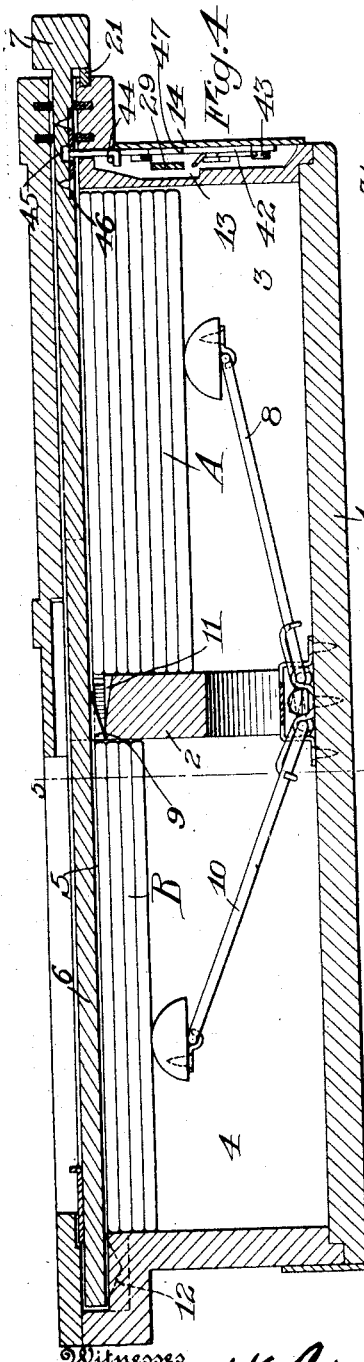
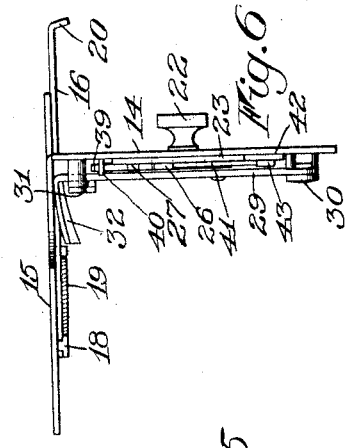
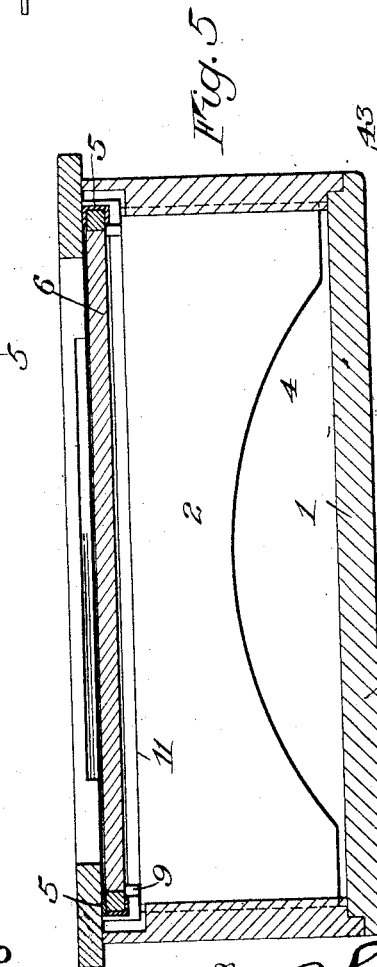
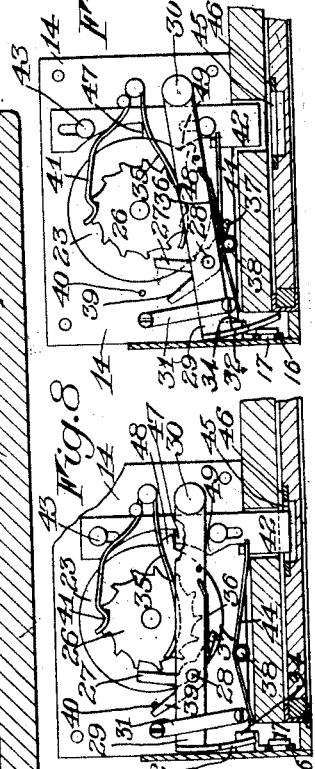

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

MAGAZINE-BACK FOR CAMERAS.

1,255,868.   Specification of Letters Patent.   Patented Feb. 12, 1918.

Application filed December 18, 1913. Serial No. 807,468.

*To all whom it may concern:*

Be it known that I, WILLIAM F. FOLMER, of Rochester, in the county of Monroe and State of New York, have invented certain new and useful Improvements in Magazine-Backs for Cameras; and I do hereby declare the following to be a full, clear, and exact description of the same, reference being had to the accompanying drawings, forming a part of this specification, and to the reference-numerals marked thereon.

My present invention relates to photography and more particularly to photographic cameras, and it has for its object to provide a camera back or magazine wherein a plurality of plates are shifted one at a time from a storage chamber to an exposing chamber and successively exposed and to provide such back with simple mechanism for counting the plates when so shifted and exposed, and for indicating which plate is in position for exposure. A further object of the invention is to provide means whereby the exposing mechanism is automatically locked when the last plate has been shifted and exposed in order to bring this fact to the attention of the operator and to prevent an inadvertent second exposure of the last plate, it being contemplated in the preferred form of the invention that the exposing and shifting functions be embodied in one element and the counting and locking functions in one mechanism. To these and other ends the invention consists in certain improvements and combinations of parts, all as will be hereinafter more fully described, the novel features being pointed out in the claims at the end of the specification.

In the drawings:

Fig. 4 is a horizontal section taken substantially on the line 4—4 of Fig. 1;

Fig. 5 is a vertical section taken substantially on the line 5—5 of Fig. 4;

Fig. 6 is a rear elevation showing the counting and locking mechanism detached;

Fig. 7 is a bottom plan view of the same mechanism, and

Figs. 8 and 9 are side views of said mechanism with the parts in two different positions incident to their operation.

Similar reference numerals throughout the several figures indicate the same parts.

Figure 1:
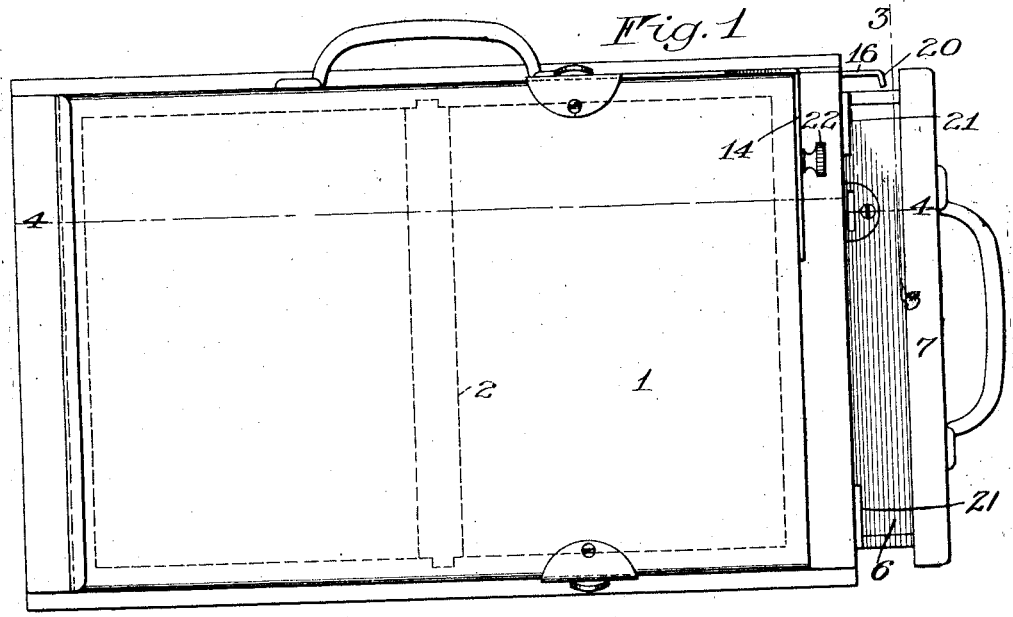
Figure 1 is a rear elevation of a magazine back constructed in accordance with and illustrating one embodiment of my invention.

In the present embodiment of the invention the magazine back is shown as a detachable structure adapted to be applied over the back of a camera, as is usual, rather than being permanently fixed thereto as an integral part, and it comprises a casing 1 divided by a central partition 2 into a supply chamber 3 and an exposure chamber 4. Mounted to operate in guides 5 at the front of the casing is a plate shifter and shutter slide 6 having a back rib or operating portion 7 projecting from one end of the casing. A plurality of plates or of septums containing film sheets, as the case may be, are placed in the supply chamber 3. These are pressed forwardly against the shifter 6 by a suitable spring actuated follower 8 so that when the shifter is pulled out the topmost plate will be engaged by a cam shoulder 9 and, with a subsequent inward movement of the shifter, will be transferred over the partition 2 into the chamber 4 where it is held against the guides 5 that define the focal plane by another spring actuated follower 10. The shoulders 9 normally occupy recesses 11 in the partition 2 and their cam faces displace the plates A in the supply chamber, temporarily, when the shifter is withdrawn until they engage the farther edge of the topmost plate and when a plate is already in the exposure chamber 4 a cam faced projection 12 temporarily displaces that plate as the advancing end of the shifter enters said chamber to make room for the new plate that follows in rear of the projection. After a plate has been shifted to the exposure chamber, the shifter 6, which also serves the function of a shutter slide, as will be seen, is drawn outwardly again during the exposure of that plate and when it again covers, a new plate is on top or in a forward position and the exposed plate is thrust to the rear within the exposure chamber 4 and so on until all of the plates A in the storage chamber have been transferred to the exposure chamber, as shown at B, and exposed.

The above description will suffice for the general construction of the magazine as devices operating along these general lines and of the same general nature are known to those skilled in the art.

In the practice of my present invention one of the end walls of the casing 1 adjacent to the guideways 5 in which the shifter 6 operates is recessed, as at 13, to accommodate the counter and locking mechanism about to be described, which mechanism is carried by a mounting plate 14 secured to the exterior of said wall over the recess 13 and has an angularly disposed extension 15 secured to the top wall of the casing, which latter is also recessed (not shown) in a suitable manner to accommodate such parts of the mechanism as are mounted on the under side of the extension. These last mentioned parts comprise a plunger 16 guided on the extension at 17 and 18 and held normally projected by a spring 19 to such an extent that its flanged end 20 lies in the path of the back rib 7, as shown more particularly in Figs. 1 and 2, and thus every time the shifter 6 is thrust inwardly to position a plate in the exposure chamber 4 and to seal the latter the plunger 16 will be thrust inwardly also against the tension of the spring 19 until the said rib or handle portion 7 on the shifter abuts against one or more rubber bumpers 21 on the casing wall, as shown in Fig. 4.

Figure 3:
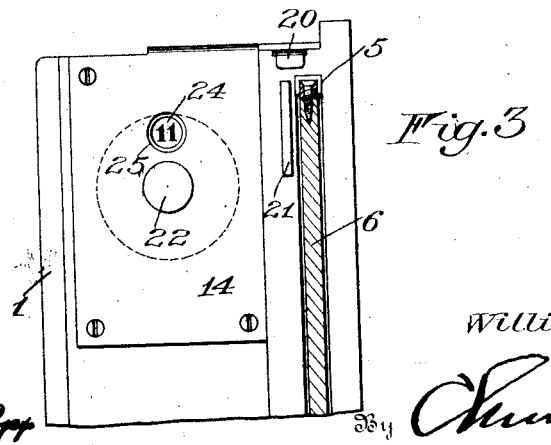
Fig. 3 is an end elevation showing the plate shifter and shutter slide in section on the line 3—3 of Fig. 1.

Journaled in the plate 14 is a shaft terminating in a knob or handle 22 on the exterior and having fixed thereto on the inside of the plate a counter wheel 23 provided on its under face with a plurality of numerals 24 successively viewable through an opening 25 in the plate as the wheel is turned (see Fig. 3). As many numerals are provided as there are plates in the supply chamber 3 when the latter is filled. There is also fixed to this shaft or to the wheel 23 a ratchet 26, the teeth of which are adapted to be engaged and moved the distance of one tooth by a pawl 27 pivoted at 28 on an actuating lever 29 pivoted at 30 each time the said lever is vibrated. The lever is guided at 31 and its adjacent end is fitted with an angularly disposed arm 32 providing a cam surface 33 which is engaged by a cam surface 34 on the plunger 16 when the latter is thrust inwardly. This action operates the lever from the position of Fig. 9 to that of Fig. 8.

Normally, or in the position of Fig. 9, the lever 29 is held back by a spring arm 35 and though the pawl 27 has a spring 36 that normally tends to move it into the path of the teeth on the ratchet 26, an arm 37 on the pawl, in the said position of the lever 29, engages a pin 38 and holds the pawl out of such path. When the lever 29 is vibrated, however, this arm leaves the pin and allows the pawl to engage the ratchet for a period sufficient to turn it the distance of one tooth at the completion of which movement another arm 39 on the pawl engages a stationary pin 40 and throws the pawl out again, as shown in Fig. 8. Thus, in either position of the lever 29, and consequently whether the shifter 6 is in or out, the pawl 27 is out of engagement and the wheel 23, together with the ratchet, is free to be turned back to reset the counter. Otherwise it would be necessary to withdraw the shifter 6 in order to reset the counter.

As before stated, the counter wheel 23 turns the distance of one tooth of the ratchet 26 at every vibration of the lever 29 and exposes a new number through the opening 25 and, therefore, each inward thrust of the shifter 6 and each transfer of a plate from the supply chamber 3 to the exposure chamber 4 is recorded. A centering spring 41 engages the ratchet and insures a uniform advance thereof under each impulse and perfect register of the numbers with the opening 25.

Figure 2:
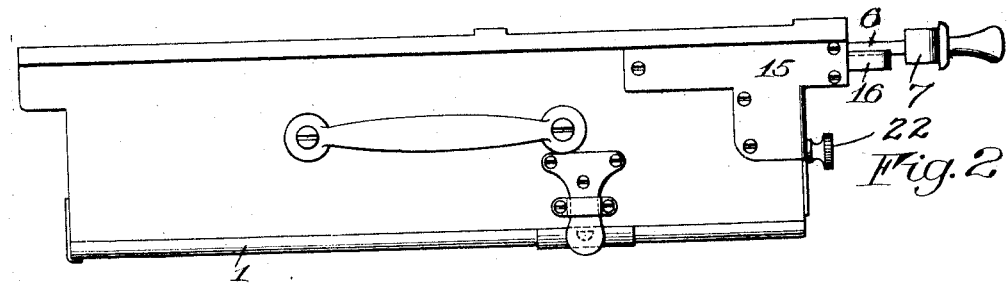
Fig. 2 is a top plan view thereof.

If, in spite of the warning given by the counter that the last plate has been exposed, the operator should withdraw the shifting member and shutter 6 more than once after the last plate has been moved to exposing position thinking that still another plate remained to be thrust into place upon the closing of the exposure, the result would be that two exposures would be made on the last plate and the plate spoiled. I, therefore, provide automatic means for locking the shifter and shutter member 6 in closed position after it has been withdrawn to expose the last plate and closed again which means includes a bolt 42 guided at 43 on the plate 14 and normally held retracted by a spring 44 mounted on the pin 38. When projected, this sliding bolt coöperates with an opening 45 in the shifter or shutter 6 when the latter is thrust in or in closed position, the opening being then in alinement with the bolts. The opening 45 is preferably fitted with a keeper plate 46, as shown in Figs. 1 and 4.

The bolt 42 is provided with an abutment 47 in the path of a projection or abutment 48 on the counter wheel 23 or movable therewith. When the counter is set at zero this abutment 48 engages the bolt at 49 (Fig. 9) and in resetting, therefore, the counter may be turned back until stopped by this engagement. As each successive plate is thereafter shifted and registered, the abutment 48 moves around to the right in Fig. 9 until by the time the last plate is thrust into position it is just above the abutment 47 on the bolt. When the shifter and shutter member 6 is withdrawn to expose that plate no motion of the counting and locking mechanism occurs, except the return of the actuating lever 29, but when the exposure is completed and the shutter member is thrust in again to terminate it, the impulse thereby given to the ratchet 26 and counter wheel 23 carries the bolt 42 into the opening 45 and locks the shutter against withdrawal until the counter is turned back in replenishing the magazine.

Of course, inasmuch as the movement of the bolt 42 occurs during that inward movement of the member 6 which brings the opening 45 into register and is dependent thereon, some leeway must be allowed it in entering the opening. I provide for this by making the opening 45 fairly wide or slightly wider than the thickness of the bolt and also the centering spring 41 for the ratchet 26 has a curved engaging face, as shown, and is so positioned that when the pawl 27 has given its full impulse to the ratchet, the latter is not turned the entire required distance but only to such a point that the centering spring 41 is poised on top of a tooth or just over the center thereof whereby in riding down the other side to occupy its position between two teeth, it gives the final impulse itself to carry the counter wheel the rest of the way. Thus, if when the actuator and pawl 27 have completed their effective movement in turning the abutment 48 on the counter wheel against the abutment 47 on the bolt the opening 45 is not quite opposite the end of the latter, the bolt will rest in yielding engagement with the keeper plate 46 or the face of the member 6 and will snap into engaging position under the influence of the spring 41 when the opening does finally reach the end of the bolt.

I claim as my invention:

1. The combination with a casing and an actuator extending through a wall thereof, of a counter wheel mounted on said wall within the casing to turn in a plane at right angles to the actuator, a plunger movable parallel with the latter and adapted to be operated thereby when the actuator is moved to one position and actuating connections between the plunger and counter wheel.

2. The combination with a casing and an actuator extending through a wall thereof, of a counter wheel mounted on said wall to turn in a plane at right angles to the actuator, a plunger movable parallel with the latter and adapted to be operated thereby when the actuator is moved to one position and operating connections between the plunger and counter wheel comprising a lever movable in a plane parallel to that of the wheel and having a cam-faced engagement with the plunger, a ratchet on the wheel and a member on the lever coöperating with the ratchet.

3. The combination with a casing and an actuator operating therein, of a counter, means not normally in engagement therewith for operating the counter by the movement of the actuator to one position, means for freeing the counter of its operating means at the conclusion of an operation and before the return of the actuator and independent means for resetting the counter.

4. The combination with a casing and an actuator operating therein, of a counter, a vibrating operating means therefor operated by the movement of the actuator to one position, a ratchet on the counter, a pawl on the operating means having a normal tendency to assume an engaging position with reference to the ratchet, means for holding the pawl out of engaging position when the operating means is at rest, means for moving the pawl to inoperative position at the conclusion of a stroke of the operating means and means for resetting the counter independently of the operating means.

5. The combination with a casing and an actuator operating therein, of a counter, a vibrating operating means therefor operated by the movement of the actuator to one position, a spring for returning the operating means to normal position, a ratchet on the counter, a pawl on the operating means, a spring operating to move the pawl to an engaging position with reference to the ratchet, an abutment engaged by the pawl when the operating means is in normal position to hold the pawl out of engaging position, a second abutment, an arm on the pawl engaging said abutment at the conclusion of an operation to withdraw the pawl from engaging position pending the return of the operating means and indepedent means for resetting the counter.

6. The combination with a casing and an actuator operating therein, of a counter movable in two directions, means not normally in engagement therewith for operating the counter by the movement of the actuator to one position, means for freeing the counter of its operating means at the conclusion of an operation and before the return of the actuator, a locking device for the latter actuated by the counter mechanism during a final counting movement thereof and indepedent means for resetting the counter and withdrawing the locking means.

7. The combination with a casing and an actuator operating therein, of a counter mechanism for registering the reciprocations of the actuator, means connected with the actuator for operating the counter through the medium of the actuator, and a locking device for the actuator adapted to directly engage it and to retain it in closed position and arranged to be positively actuated by the actuator through the medium of the counter mechanism after a predetermined number of movements thereof.

8. The combination with a casing and an actuator operating therein, of a locking device for the actuator, means tending to move it to inoperative position, operating mechanism for the locking device including a counter adapted to move the locking device to operative position after a predetermined numebr of impulses have been given said operating mechanism, connections between the latter and the actuator for giving an impulse to the operating mechanism upon each operation of the actuator, and independent means for resetting the counter and thereby releasing the locking device.

9. The combination with a casing and an actuator operating therein, of a locking device for the actuator, operating mechanism for the locking device adapted to move the latter to operative position after a predetermined number of impulses have been given said operating mechanism and including a spring arranged to impart final movement to the locking device under the last such impulse, and connections between the operating mechanism and the actuator for giving an impulse to the operating mechanism upon each operation of the actuator.

10. The combination with a casing and an actuator operating therein, of a locking device for the actuator, a rotary element embodying a counter provided with an abutment adapted to engage the locking device and actuate it to operative position when the rotary element has been turned a predetermined degree, means moved by the actuator at each operation thereof for giving a partial rotation to the rotary member through a portion of such degree, and means for resetting the counter, the locking device being adapted to act as a stop for the counter upon such resetting movement.

11. The combination with a casing and an actuator operating therein, of a sliding bolt adapted to engage and lock the actuator in closed position and provided with an abutment, a rotary element provided with an abutment adapted to engage that on the bolt and to directly actuate the latter to operative position when the rotary element has been turned a predetemined degree, a ratchet on the rotary element, a pawl adapted to engage the ratchet and give a partial rotation to the rotary member through a portion of such degree and connections causing the pawl to be actuated by and upon each operation of the actuator.

12. The combination with a casing and an actuator operating therein, of a locking device for the actuator, operating mechanism for the locking device embodying a counter adapted to move the locking device to operative position after a predetermined number of impulses have been given said operating mechanism, a spring for withdrawing the locking device, connections between the operating mechanism and the actuator for giving an impulse to the operating mechanism upon each operation of the actuator, and a common means for resetting the counter and releasing the locking device through the medium of the counter in one operation.

WILLIAM F. FOLMER.

Witnesses:
H. E. STONEBRAKER,
RUSSELL B. GRIFFITH.